(12) United States Patent
Oka et al.

(10) Patent No.: US 11,720,305 B2
(45) Date of Patent: Aug. 8, 2023

(54) PRINTER AND NON-TRANSITORY COMPUTER READABLE MEDIUM FOR CONTINUING OR SUSPENDING EXECUTION OF A PRINT JOB IN CASE OF A DISAGREEMENT STATE OF A PAPER SIZE

(71) Applicant: FUJIFILM BUSINESS INNOVATION CORP., Tokyo (JP)

(72) Inventors: Hirooki Oka, Kanagawa (JP); Kazunobu Uchiyama, Kanagawa (JP); Hideo Kimura, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 469 days.

(21) Appl. No.: 16/869,767

(22) Filed: May 8, 2020

(65) Prior Publication Data

US 2021/0132883 A1 May 6, 2021

(30) Foreign Application Priority Data

Nov. 5, 2019 (JP) ................................. 2019-201009

(51) Int. Cl.
*G06F 3/12* (2006.01)
(52) U.S. Cl.
CPC .......... *G06F 3/1255* (2013.01); *G06F 3/1205* (2013.01); *G06F 3/1208* (2013.01); *G06F 3/1254* (2013.01)

(58) Field of Classification Search
None
See application file for complete search history.

(56) References Cited

U.S. PATENT DOCUMENTS

| 2006/0026600 A1* | 2/2006 | Yoshida | H04N 1/00204 |
| | | | 719/310 |
| 2015/0347071 A1* | 12/2015 | Naminoue | G06F 3/1234 |
| | | | 358/1.14 |
| 2019/0362203 A1* | 11/2019 | Sung | G06F 3/1285 |

FOREIGN PATENT DOCUMENTS

JP 2017-208800 A 11/2017

* cited by examiner

*Primary Examiner* — Lennin R Rodriguezgonzalez
(74) *Attorney, Agent, or Firm* — Oliff PLC

(57) ABSTRACT

A printer includes a processor receiving a print job from a first driver and a second driver supporting a smaller number of initially set sizes of printing media selectable by a user than a number of initially set sizes of printing media supported by the first driver, determines which driver the print job is received from, performs suspension control suspending print job execution in a case where there occurs a disagreement state in which a size of a printing medium designated by the print job and a size of a printing medium supplied from a supply section during execution of the print job are different from each other during execution of a print job received from the first driver, and performs continuation control continuing execution of the print job in a case where there occurs the disagreement state during execution of a print job received from the second driver.

10 Claims, 9 Drawing Sheets

PRINTER AND NON-TRANSITORY COMPUTER READABLE MEDIUM FOR CONTINUING OR SUSPENDING EXECUTION OF A PRINT JOB IN CASE OF A DISAGREEMENT STATE OF A PAPER SIZE

CROSS-REFERENCE TO RELATED APPLICATIONS

This application is based on and claims priority under 35 USC 119 from Japanese Patent Application No. 2019-201009 filed Nov. 5, 2019.

BACKGROUND

(i) Technical Field

The present disclosure relates to a printer and a non-transitory computer readable medium.

(ii) Related Art

Japanese Unexamined Patent Application Publication No. 2017-208800 discloses a printer that includes: a reception unit that receives a print instruction; a storage unit that stores a paper size set for a paper storage section as setting information; and a print control unit that acquires information on the paper size set for the paper storage section designated in the print instruction received by the reception unit from the setting information stored in the storage unit, and that performs control so as to execute a print process using the paper size designated in the print instruction in the case where the acquired paper size and the paper size designated in the print instruction are different from each other.

SUMMARY

In the case where printing is to be performed on printing media for forms of a wide variety of special sizes, a user occasionally executes printing using a driver that supports a small number of initially set sizes of printing media that are selectable by the user, among a plurality of drivers. While it is necessary for the user to execute printing after designating the individual size of printing media for forms by setting such a size to the driver, the user tends to execute printing while designating a size that is different from the actual size of the printing media, rather than setting an accurate size, since it takes trouble to do so. In such a case, it would be more convenient to continue the printing, rather than suspending the printing, even if the size of printing media designated by a print job and the size of the supplied printing media for forms are different from each other, since the user started the print job while being aware of the difference.

Aspects of non-limiting embodiments of the present disclosure relate to providing a printer that determines a print job for which a user would preferentially desire to continue printing, and that continues execution of such a print job, rather than suspending execution thereof, even if there occurs a disagreement state.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a printer including a processor configured to receive a print job from a first driver and a second driver that supports a smaller number of initially set sizes of printing media that are selectable by a user than a number of initially set sizes of printing media that is supported by the first driver, determine which driver the print job is received from, perform suspension control for suspending execution of the print job in a case where there occurs a disagreement state in which a size of a printing medium designated by the print job and a size of a printing medium supplied from a supply section during execution of the print job are different from each other during execution of a print job received from the first driver, and perform continuation control for continuing execution of the print job in a case where there occurs the disagreement state during execution of a print job received from the second driver.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below with reference to the drawings.

First Exemplary Embodiment (Printer 10)

Figure 1:
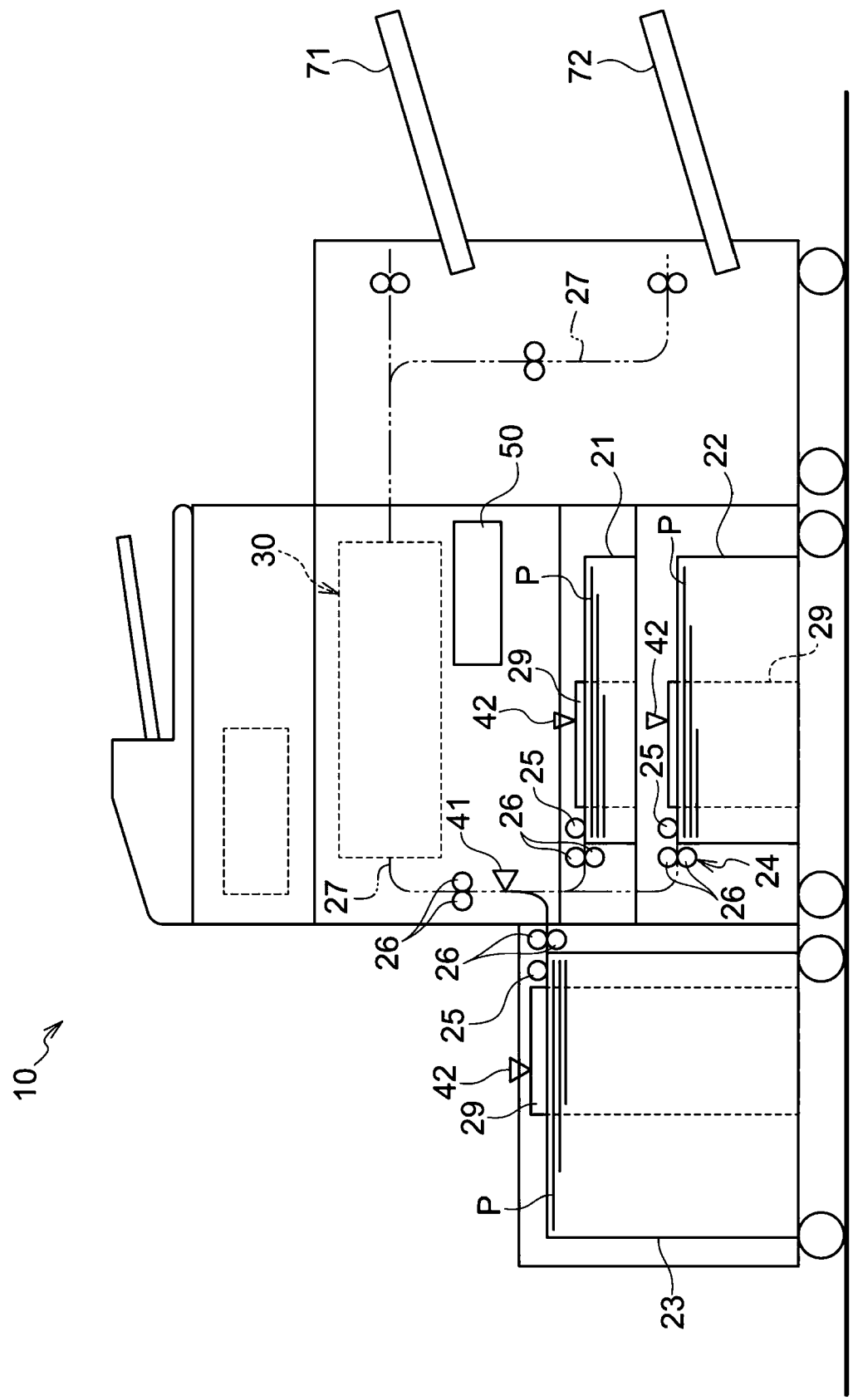
FIG. 1 is a schematic view illustrating the configuration of a printer according to a first exemplary embodiment.

First, the configuration of a printer 10 according to the present exemplary embodiment will be described. FIG. 1 is a schematic view illustrating the configuration of the printer 10 according to the present exemplary embodiment.

The printer 10 is an example of a "printer" that prints an image on a printing medium such as paper P. Specifically, the printer 10 prints an image on a printing medium on the basis of an acquired print job. The print job refers to a unit for processing print operation specified by a single print instruction. The printer 10 is also an example of an image forming apparatus that forms an image on a printing medium.

More specifically, as illustrated in FIG. 1, the printer 10 includes storage sections 21, 22, and 23, a printing section 30, ejection sections 71 and 72, a first detection section 41, a second detection section 42, and a control device 50. In the following description, a printing medium on which printing is performed by the printer 10 is occasionally referred to specifically as "paper".

(Storage Sections 21, 22, and 23)

The storage sections 21, 22, and 23 are examples of a "supply section". The storage sections 21, 22, and 23 have a function of storing the paper P to be supplied to the printing section 30. The storage sections 21, 22, and 23 are specifically constituted as storage trays that store the paper P as stacked thereon, for example. The number of sheets of the paper P that may be stored in the storage sections 21, 22, and 23 becomes larger in the order of the storage sections 21, 22, and 23.

The storage sections 21, 22, and 23 are each provided with a pair of positioning sections 29 that contact side ends of the paper P on both sides to position the paper P in the width direction of the paper P. The width direction of the paper P is an intersecting direction (direction of the depth of the sheet surface of FIG. 1) that intersects a transport direction in which the paper P is transported. In FIG. 1, only the positioning section 29 disposed on one side (specifically, the back side of the sheet surface of FIG. 1), of the pair of positioning sections 29, is illustrated. The printer 10 may include two storage sections, or may include four or more storage sections.

(Transport Section 24)

The transport section 24 has a function of transporting the paper P stored in the storage sections 21, 22, and 23 to the printing section 30. Specifically, the transport section 24 includes a feed roller 25 that feeds the paper P from each of the storage sections 21, 22, and 23 and a plurality of transport roller pairs 26 disposed along a transport path 27 from the storage sections 21, 22, and 23 to the printing section 30, for example.

The transport section 24 supplies the paper P to the printing section 30 by the feed roller 25 feeding the paper P from one of the storage sections 21, 22, and 23 and the plurality of transport roller pairs 26 transporting the paper P to the printing section 30. The transport section 24 feeds the paper P from one of the storage sections 21, 22, and 23 designated in a print job, and supplies the paper P to the printing section 30, for example.

(Printing Section 30)

The printing section 30 has a function of printing an image on the paper P. Specifically, the printing section 30 prints an image on the paper P through electrophotography. More specifically, the printing section 30 prints an image, that is, forms an image, on the paper P through processes such as charging, exposure, development, transfer, and fixation. Thus, the printing section 30 is also an image forming section that forms an image on the paper P. The printing section 30 has a function of printing an image on both surfaces of the paper P by inverting and transporting the paper P.

(Ejection Sections 71 and 72)

The paper P which has been subjected to printing is ejected to the ejection sections 71 and 72. The ejection sections 71 and 72 are disposed vertically. Specifically, the ejection section 72 is disposed under the ejection section 71. The paper P is ejected to one of the ejection sections 71 and 72 designated in a print job.

(First Detection Section 41)

The first detection section 41 is a detection section that detects the front end and the rear end of the paper P. The first detection section 41 is disposed at a predetermined reference position on the downstream side in the transport direction with respect to the storage sections 21, 22, and 23 and on the upstream side in the transport direction with respect to the printing section 30. The first detection section 41 detects, at the reference position, the front end and the rear end of the paper P to be supplied from the storage sections 21, 22, and 23 to the printing section 30. The first detection section 41 is constituted as a transmission light sensor that emits light at the reference position, for example. The detection results from the first detection section 41 are used to detect a paper length (i.e. the dimension of the paper P along the transport direction) as discussed later.

(Second Detection Section 42)

The second detection section 42 is provided to each of the storage sections 21, 22, and 23. The second detection section 42 is a detection section that detects the positions of the pair of positioning sections 29 in each of the storage sections 21, 22, and 23. The second detection section 42 is constituted as a position sensor that uses a light sensor etc., for example. The detection results from the second detection section 42 are used to detect a paper width (i.e. the dimension of the paper P along the width direction) of the paper P as discussed later.

(Control Device 50)

Figure 2:
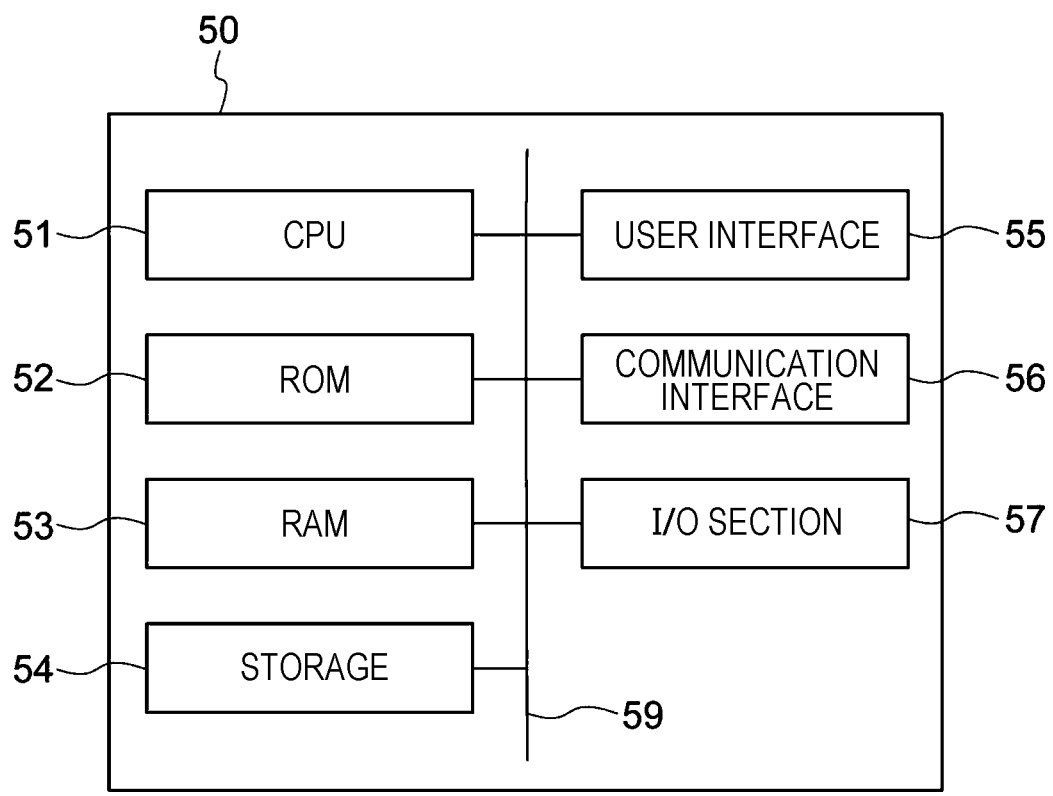
FIG. 2 is a block diagram illustrating the hardware configuration of a control device according to the first exemplary embodiment.

The control device 50 is a device that controls operation of the various sections of the control device 10. FIG. 2 is a block diagram illustrating the hardware configuration of the control device 50.

As illustrated in FIG. 2, the control device 50 has a function of a computer, and includes a central processing unit (CPU: processor) 51, a read only memory (ROM) 52, a random access memory (RAM) 53, a storage 54, a user interface 55, a communication interface 56, and an input/output (I/O) section 57. The various sections of the control device 50 are communicably connected to each other via a bus 59.

The CPU 51 is a central processing unit, and executes various programs and control various sections. That is, the CPU 51 reads programs from the ROM 52 or the storage 54, and executes the programs using the RAM 53 as a work area. The CPU 51 controls the various sections of the printer 10 and performs various computation processes in accordance with the programs stored in the ROM 52 or the storage 54.

The ROM 52 stores various programs and various data. The RAM 53 serves as a work area to temporarily store the programs and the data. The storage 54 is constituted as a hard disk drive (HDD) or a solid state drive (SSD), and stores various programs including an operating system and various data.

The user interface 55 is an interface for the user of the printer 10 to use the printer 10. The user interface 55 has an input section such as buttons and a touch screen and a display section such as a liquid crystal display, for example.

The communication interface 56 is an interface for communication with a user terminal such as a personal computer. The communication interface 56 communicates using a wire or wirelessly. The communication interface 56 uses a communication standard such as Ethernet (registered trademark), fiber-optic data distribution interface (FDDI), and Wi-Fi (registered trademark), for example. The I/O section 57 connects the CPU 51 to the various sections of the printer 10.

Figure 3:
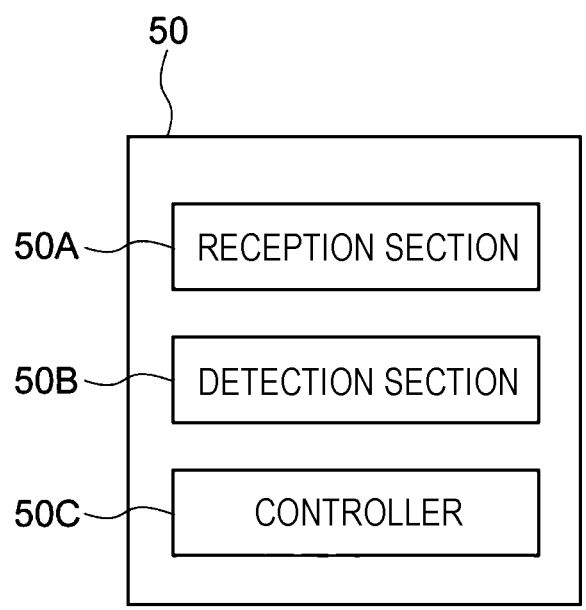
FIG. 3 is a block diagram illustrating an example of the functional configuration of the control device according to the first exemplary embodiment.

To execute the programs described above, the control device 50 implements various functions using the hardware resources described above. The functional configuration implemented by the control device 50 will be described. FIG. 3 is a block diagram illustrating an example the functional configuration of the control device 50.

As illustrated in FIG. 3, the control device 50 includes a reception section 50A, a detection section 50B, and a controller 50C as functional components. The functional components are implemented by the CPU 51 reading and executing a print program stored in the ROM 52 or the storage 54.

The reception section 50A receives a print job from a first driver (hereinafter referred to as a "regular size driver") and a second driver (hereinafter referred to as a "form driver") with a smaller number of initially set sizes of printing media that are selectable by the user than that of the regular size driver. The print job specifies the paper size, the number of pages to be printed, the storage section from which the paper P is fed, the ejection section to which the paper P is to be ejected, etc. The reception section 50A receives information such as the paper size, the number of pages to be printed, the storage section, and the ejection section specified in the print job as print information on the print job.

In the present exemplary embodiment, by way of example, a print job is input by a print instruction provided through a user terminal that is communicable through the communication interface 56, and received by the reception section 50A.

The regular size driver and the form driver are printer drivers installed in the user terminal. The regular size driver is principally selected in the case where printing is to be performed on printing media of regular sizes such as the paper P. The form driver is principally selected in the case where printing is to be performed on printing media for forms of irregular sizes.

The form driver is assumed to be selected in the case where printing is to be performed on printing media for forms of irregular sizes, and therefore support a smaller number of initially set sizes (specifically, regular sizes) of printing media that are selectable by the user than that of the regular size driver. Meanwhile, the form driver enables the user to additionally set a larger number of sizes of printing media than that of the regular size driver.

On the other hand, the regular size driver is assumed to be selected in the case where printing is to be performed on printing media of regular sizes such as the paper P, and therefore support a larger number of initially set sizes of printing media that are selectable by the user than that of the form driver. Meanwhile, the regular size driver enables the user to additionally set a smaller number of sizes of printing media than that of the form driver.

In the case where printing is to be performed on printing media of a size that is not selectable by the driver, such as printing media for a form of an irregular size, a size that is close to such a size is designated in the print job.

The forms are printing media in a predetermined format on which transactions or comings and goings of money, articles, and services are to be printed. The forms are used by public offices, municipalities, etc., for example. Examples of the forms include a house and land tax payment statement. Information to be printed on the forms is peculiar to the transaction partner, the trader, etc. Therefore, there are few cases where exactly the same information is to be printed on a plurality of pages at a time, and printing is often performed on a single page. In the following, printing on printing media for forms is occasionally referred to as "form printing".

The detection section 50B detects a paper size of the paper P supplied from the storage sections 21, 22, and 23 during execution of a print job. Specifically, the detection section 50B detects a paper size of the paper P fed from the storage sections 21, 22, and 23 as follows. The paper size is an example of a "size of a printing medium".

The detection section 50B detects a paper length (i.e. the dimension of the paper P along the transport direction) on the basis of the results of detection by the first detection section 41. Specifically, the detection section 50B detects, as the paper length, a value obtained by multiplying the passage duration of the paper P, which is calculated from the passage times of the front end and the rear end of the paper P detected by the first detection section 41, by the transport speed of the paper P.

Further, the detection section 50B detects a paper width (i.e. the dimension of the paper P along the width direction) of the paper P on the basis of the results of detection by the second detection section 42. Specifically, the detection section 50B detects, as the paper width (i.e. the dimension of the paper P along the width direction), a distance calculated from the positions of the pair of positioning sections 29 detected by the second detection section 42 provided to the storage section from which the paper P is fed. The detection section 50B detects a paper size from the detected paper length and the detected paper width.

The controller 50C determines which driver a print job is received from, and performs suspension control for suspending execution of the print job (hereinafter referred to simply as "suspension control") in the case where there occurs a disagreement state (hereinafter referred to as a "mismatched state"), in which the size of a printing medium designated by the print job and the size of a printing medium supplied from the storage sections 21, 22, and 23 during execution of the print job are different from each other, during execution of a print job received from the regular size driver.

Further, the controller 50C performs continuation control for continuing execution of the print job (hereinafter referred to simply as "continuation control") in the case where there occurs a mismatched state during execution of a print job received from the form driver.

(Function of Control Device 50)

Figure 4:
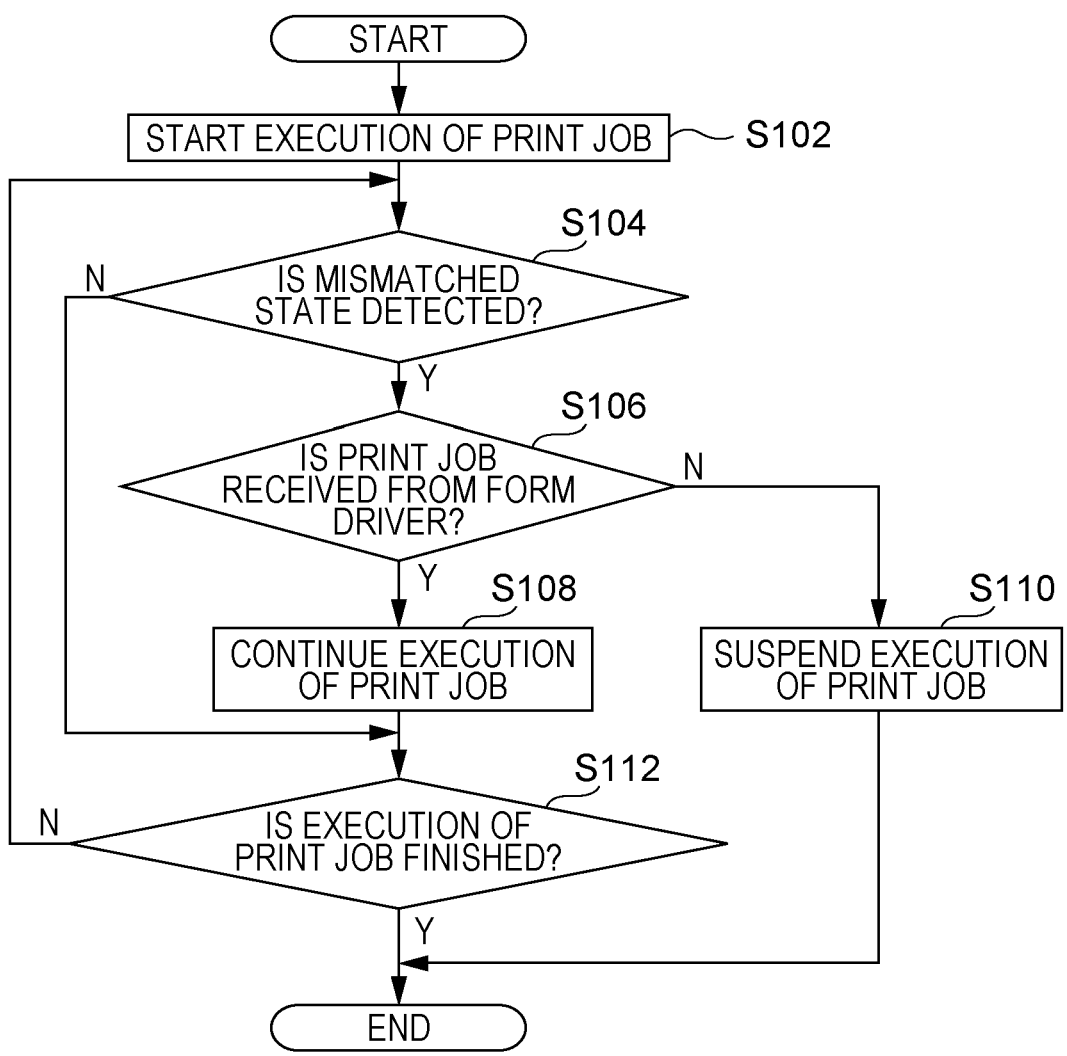
FIG. 4 is a flowchart illustrating the flow of a print process performed by the printer according to the first exemplary embodiment.

Next, the function of the control device 50 will be described. FIG. 4 is a flowchart illustrating the flow of a print process performed by the control device 50.

The print process is performed by the CPU 51 reading and executing a print program from the ROM 52 or the storage 54.

As illustrated in FIG. 4, when a print job is acquired, the CPU 51 starts executing the print job (step S102). That is, when a print job is acquired, the CPU 51 causes the various sections of the printer 10 to operate. Consequently, the transport section 24 supplies the paper P from one of the storage sections 21, 22, and 23 designated by the print job toward the printing section 30. The first detection section 41 detects the front end and the rear end of the paper P supplied toward the printing section 30. The second detection sections 42 each detect the positions of the pair of positioning sections 29 in each of the storage sections 21, 22, and 23. The CPU 51 detects a paper size from such detection results as discussed above.

Next, the CPU 51 determines whether or not there has occurred a mismatched state (step S104). The mismatched state is a disagreement state in which the paper size designated by the print job and the paper size of the paper P supplied from the storage sections 21, 22, and 23 during execution of the print job are different from each other as discussed above.

The CPU 51 proceeds to step S106 in the case where it is determined in step S104 that there has occurred a mismatched state, and proceeds to step S112 in the case where it is determined that there has not occurred a mismatched state.

In step S106, the CPU 51 determines whether or not the print job is received from the form driver. In the case where it is determined in step S106 that the print job is received from the form driver, the CPU 51 performs continuation control for continuing execution of the print job (step S108), and proceeds to step S112.

In the case where it is determined in step S106 that the print job is not received from the form driver, on the other hand, the CPU 51 considers that there has occurred a mismatched state during execution of a print job received from the regular size driver, performs suspension control for suspending execution of the print job, and ends the print process (step S110). Consequently, operation of the various sections of the printer 10 is stopped. Specifically, operation of the storage sections 21, 22, and 23 to supply the next paper P to the printing section 30, operation of the printing section 30 to print on the paper P, etc. are stopped.

In step S112, the CPU 51 determines whether or not execution of the print job is finished. The CPU 51 ends the print process in the case where it is determined in step S112 that execution of the print job is finished, and returns to step S104 in the case where it is determined that execution of the print job is not finished.

In the present exemplary embodiment, it is determined whether or not there has occurred a mismatched state until execution of the print job is finished or execution of the print job is suspended. The determination as to whether or not there has occurred a mismatched state is performed each time the paper P is supplied from the storage sections 21, 22, and 23 toward the printing section 30.

In the present exemplary embodiment, as described above, the CPU 51 performs continuation control for continuing execution of the print job in the case where there occurs a mismatched state in a print job received from the form driver.

In other words, in the present exemplary embodiment, in the case where there occurs a mismatched state in a print job received from the form driver, it is determined that the print job has been given with the user being aware of the difference between the size of a printing medium designated by the print job and the size of a supplied printing medium, even if there is any such difference, and execution of the print job is continued.

In the present exemplary embodiment, in this manner, a print job for which a user would desire to preferentially continue printing is determined, and execution of such a print job is continued, rather than suspending execution thereof, even if there occurs a mismatched state.

In the present exemplary embodiment, in addition, a print job for which a user would desire to preferentially continue printing is determined for each print job, and thus it is determined for each print job whether to continue or suspend execution of the print job.

Modification of First Exemplary Embodiment

The controller 50C may not necessarily perform continuation control, and may occasionally perform continuation control and occasionally perform suspension control in accordance with the content specified from the form driver, in the case where there occurs a mismatched state during execution of a print job received from the form driver. For example, the controller 50C may be configured to perform continuation control in the case where the print job is a print job that designates any of the storage sections 21, 22, and 23 and there occurs a mismatched state.

In other words, the controller 50C may be configured to perform suspension control in the case where the print job is a print job that does not designate any of the storage sections 21, 22, and 23 and there occurs a mismatched state during execution of a print job received from the form driver.

In the present modification, the controller 50C does not switch the storage section from which the paper P is supplied to a different storage section in the case where any of the storage sections 21, 22, and 23 is designated in a print job, even in the case where there is no paper P in the designated storage section.

In the case where the print job is a print job that does not designate any of the storage sections 21, 22, and 23, on the other hand, the controller 50C supplies the paper P from a predetermined one of the storage sections 21, 22, and 23, and switches the storage section to a different storage section when there is no paper P in the predetermined storage section.

As discussed earlier, form printing is often performed on a single page, and the paper P for form printing is often stored in only a specific storage section. Therefore, it is assumed that form printing is performed with any of the storage sections 21, 22, and 23 designated. Therefore, in the present modification, continuation control is performed in a print job that designates any of the storage sections 21, 22, and 23 as a print job that is highly likely to be form printing.

The function of the present modification will be described below.

Figure 5:
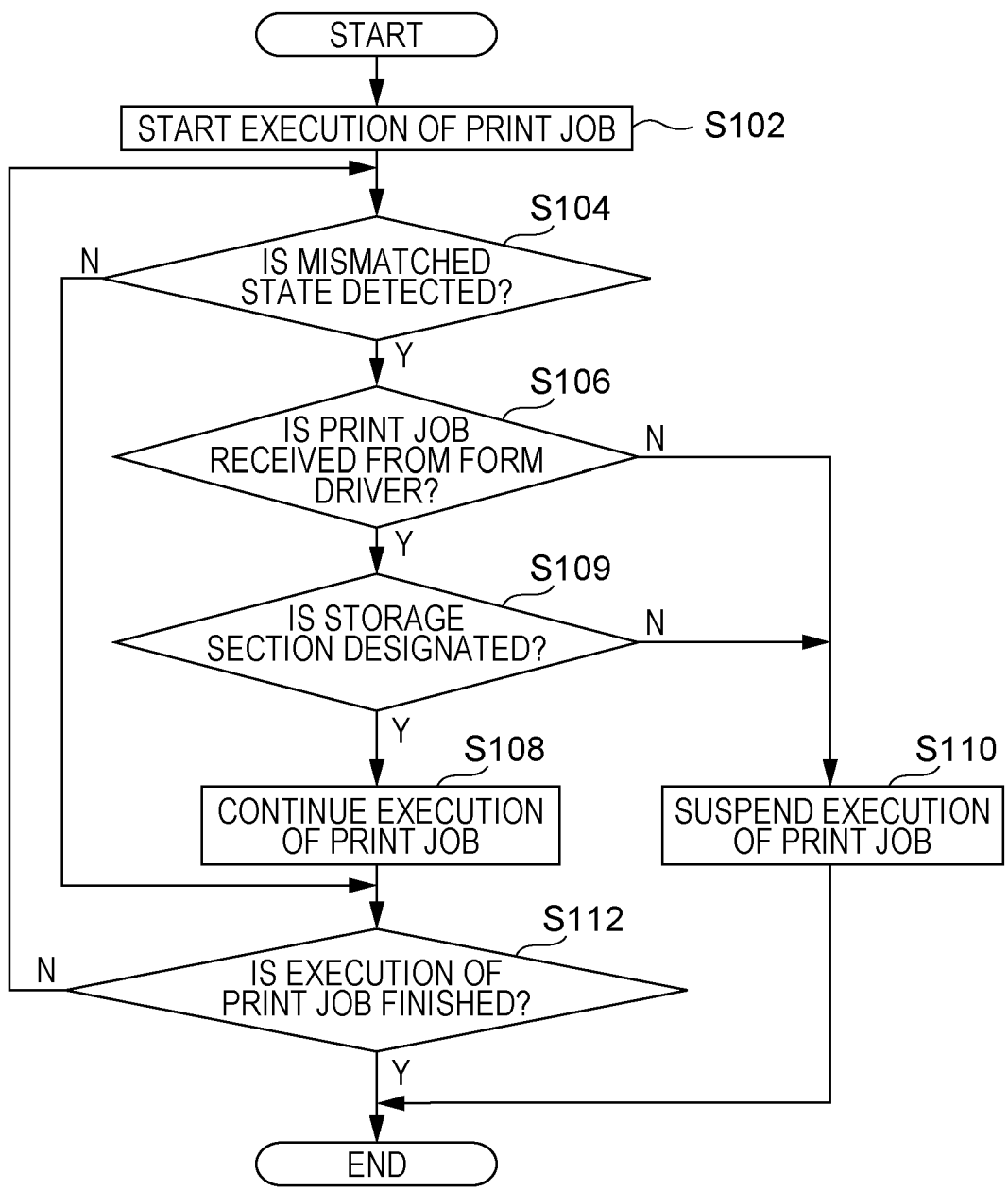
FIG. 5 is a flowchart illustrating the flow of a print process performed by a printer according to a modification the first exemplary embodiment.

In the modification, as illustrated in FIG. 5, the CPU 51 proceeds to step S109 in the case where it is determined in step S106 that the print job is received from the form driver.

In the case where it is determined in step S106 that the print job is not received from the form driver, on the other hand, the CPU 51 considers that there has occurred a mismatched state during execution of a print job received from the regular size driver, performs suspension control, and ends the print process (step S110).

In step S109, the CPU 51 determines whether or not any of the storage sections 21, 22, and 23 is designated in the print job. In the case where it is determined in step S109 that any of the storage sections 21, 22, and 23 is designated in the print job, the CPU 51 performs continuation control (step S108), and proceeds to step S112.

In the case where it is determined in step S109 that any of the storage sections 21, 22, and 23 is not designated in the print job, on the other hand, the CPU 51 performs suspension control (step S110), and ends the print process.

In the present modification, as described above, the CPU 51 performs continuation control in the case where the print job is a print job that designates any of the storage sections 21, 22, and 23 and there occurs a mismatched state during execution of a print job received from the form driver.

In a configuration (hereinafter referred to as a "first configuration") in which continuation control is performed also in the case where the print job is a print job that does not designate any of the storage sections 21, 22, and 23 and there occurs a mismatched state during execution of a print job received from the form driver, there is a low possibility of form printing since any of the storage sections 21, 22, and 23 is not designated in the print job, and erroneous printing in which printing is performed on paper of a size not intended by the user tends to be caused.

In the present modification, on the contrary, the CPU 51 performs continuation control in the case where the print job is a print job that designates any of the storage sections 21, 22, and 23 and there occurs a mismatched state, as discussed earlier.

Second Exemplary Embodiment

Figure 6:
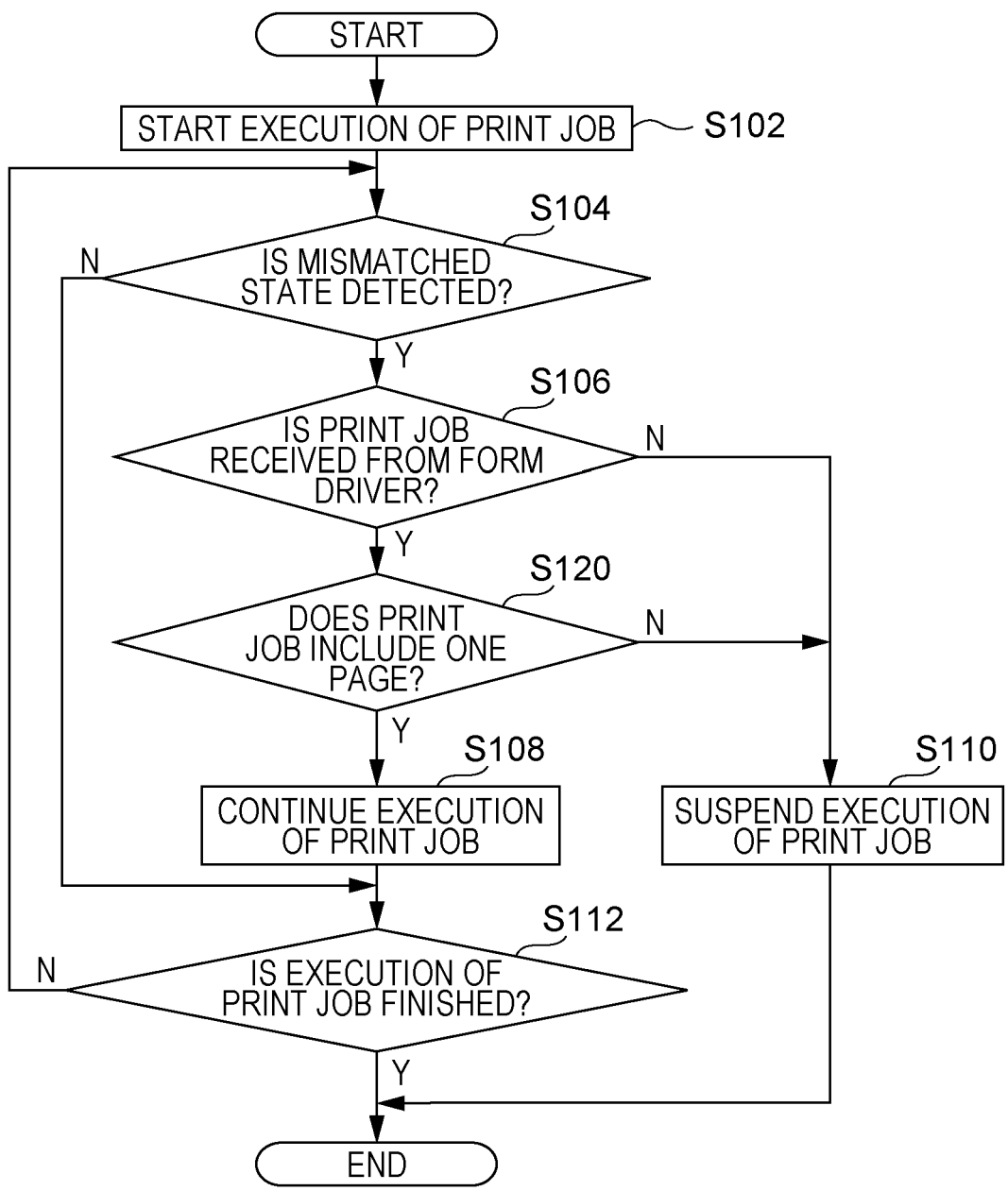
FIG. 6 is a flowchart illustrating the flow of a print process performed by a printer according to a second exemplary embodiment.

Next, a second exemplary embodiment will be described. FIG. 6 is a flowchart illustrating the flow of a print process according to the second exemplary embodiment. Portions of the present exemplary embodiment that are the same as the corresponding portions of the first exemplary embodiment are given the same reference numerals to omit description thereof as appropriate.

In the second exemplary embodiment, the controller 50C performs suspension control in the case where the print job includes a predetermined number of pages or more and there occurs a mismatched state during execution of a print job received from the form driver.

Meanwhile, the controller 50C performs continuation control in the case where the print job includes less than the predetermined number of pages and there occurs a mismatched state during execution of a print job received from the form driver.

In the present exemplary embodiment, the predetermined number of pages is two, by way of example. That is, in the present exemplary embodiment, the controller 50C performs continuation control in the case where the print job includes one page and there occurs a mismatched state during execution of a print job received from the form driver. The predetermined number of pages is not limited to two, and the predetermined number of pages may be three or more. The predetermined number of pages is limited to two or more, and may not be one.

The function of the second exemplary embodiment will be described below.

As illustrated in FIG. 6, the CPU 51 proceeds to step S120 in the case where it is determined in step S106 that the print job is received from the form driver. In step S120, the CPU 51 determines whether or not the print job includes less than a predetermined number of pages during execution of a print job received from the form driver. Specifically, the CPU 51 determines whether or not the print job includes one page during execution of a print job received from the form driver in step S120.

In the case where it is determined in step S120 that the print job includes one page, the CPU 51 performs continuation control for continuing execution of the print job (step S108), and proceeds to step S112.

In the case where it is determined in step S120 that the print job includes two pages or more, on the other hand, the CPU 51 performs suspension control for suspending execution of the print job (step S110), and ends the print process. Consequently, operation of the various sections of the printer 10 is stopped. Specifically, operation of the storage sections 21, 22, and 23 to supply the next paper P to the printing section 30, operation of the printing section 30 to print on the paper P, etc. are stopped.

In the present exemplary embodiment, as described above, the CPU 51 performs suspension control in the case where the print job includes a predetermined number of pages or more and there occurs a mismatched state during execution of a print job received from the form driver.

Meanwhile, the CPU 51 performs continuation control in the case where the print job includes less than the predetermined number of pages and there occurs a mismatched state during execution of a print job received from the form driver.

In a configuration (hereinafter referred to as a "second configuration") in which continuation control is performed irrespective of the number of pages included in a print job, continuation control is performed even if the print job includes a plurality of number of pages (e.g. 100 pages), for example. Since the form printing is often performed for one page as discussed earlier, there erroneous printing tends to be caused with the second configuration. In the case where erroneous printing in which printing is performed on paper of a size not intended by the user is caused, erroneous printing is performed for a plurality of pages (e.g. 100 pages).

In the present exemplary embodiment, on the contrary, continuation control is performed in the case where the print job includes one page. Therefore, erroneous printing is unlikely to be caused, and even in the case where erroneous printing is caused, erroneous printing is performed for only one page.

Modification of Second Exemplary Embodiment

The controller 50C may be configured to perform continuation control in the case where the print job includes a predetermined number of pages or more, the print job is a print job that designates any of the storage sections 21, 22, and 23, and there occurs a mismatched state during execution of a print job received from the form driver.

In other words, the controller 50C may be configured to perform suspension control in the case where the print job includes a predetermined number of pages or more, the print job is a print job that does not designate any of the storage sections 21, 22, and 23, and there occurs a mismatched state during execution of a print job received from the form driver.

Figure 7:
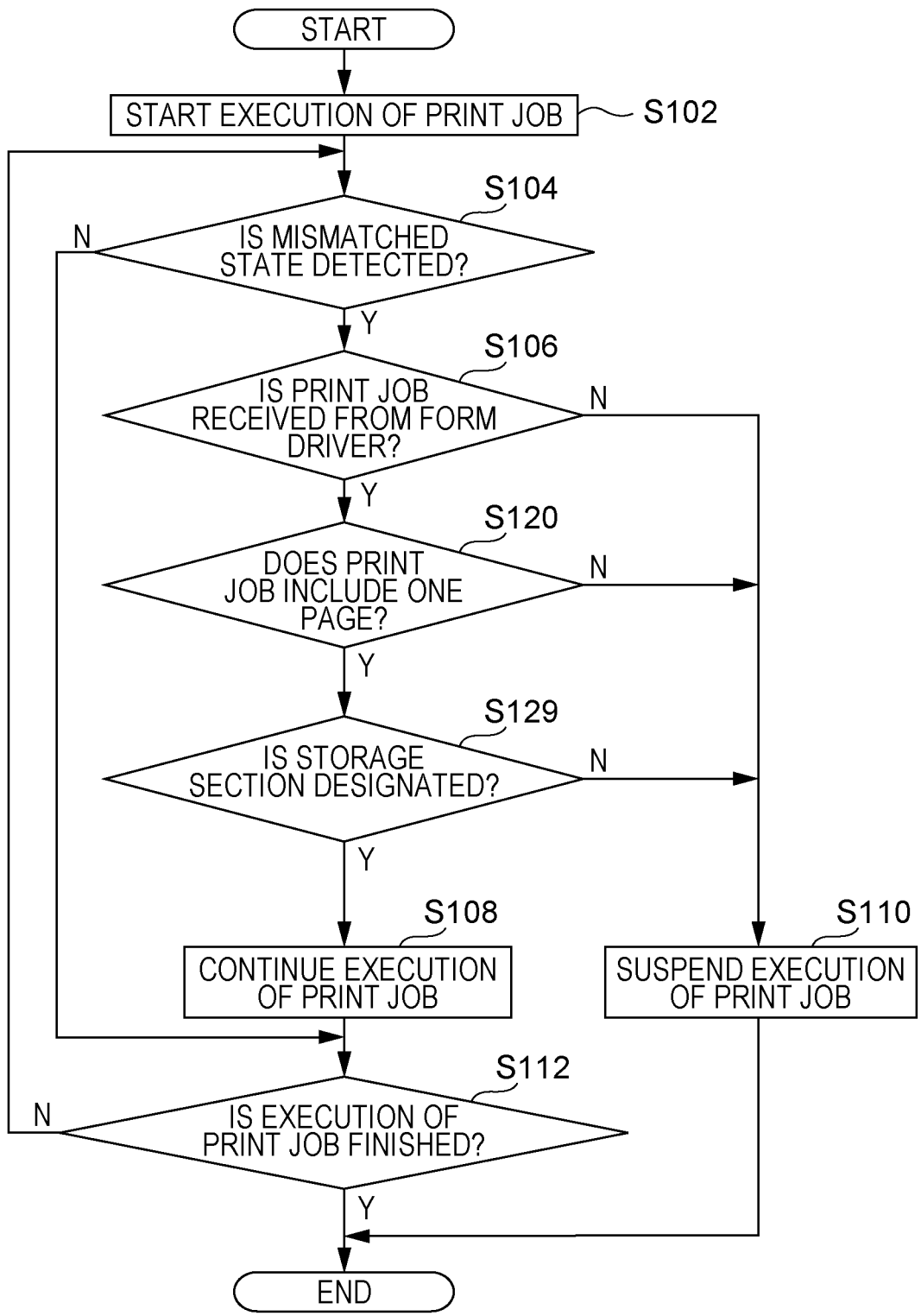
FIG. 7 is a flowchart illustrating the flow of a print process performed by a printer according to a modification the second exemplary embodiment.

In the modification, as illustrated in FIG. 7, the CPU 51 proceeds to step S129 in the case where it is determined in step S120 that the print job includes one page.

In the case where it is determined in step S120 that the print job includes two pages or more, on the other hand, the CPU 51 performs suspension control for suspending execution of the print job (step S110), and ends the print process.

In step S129, the CPU 51 determines whether or not any of the storage sections 21, 22, and 23 is designated in the print job. In the case where it is determined in step S129 that any of the storage sections 21, 22, and 23 is designated in the print job, the CPU 51 performs continuation control (step S108), and proceeds to step S112.

In the case where it is determined in step S129 that any of the storage sections 21, 22, and 23 is not designated in the print job, on the other hand, the CPU 51 performs suspension control (step S110), and ends the print process.

Third Exemplary Embodiment

Figure 8:
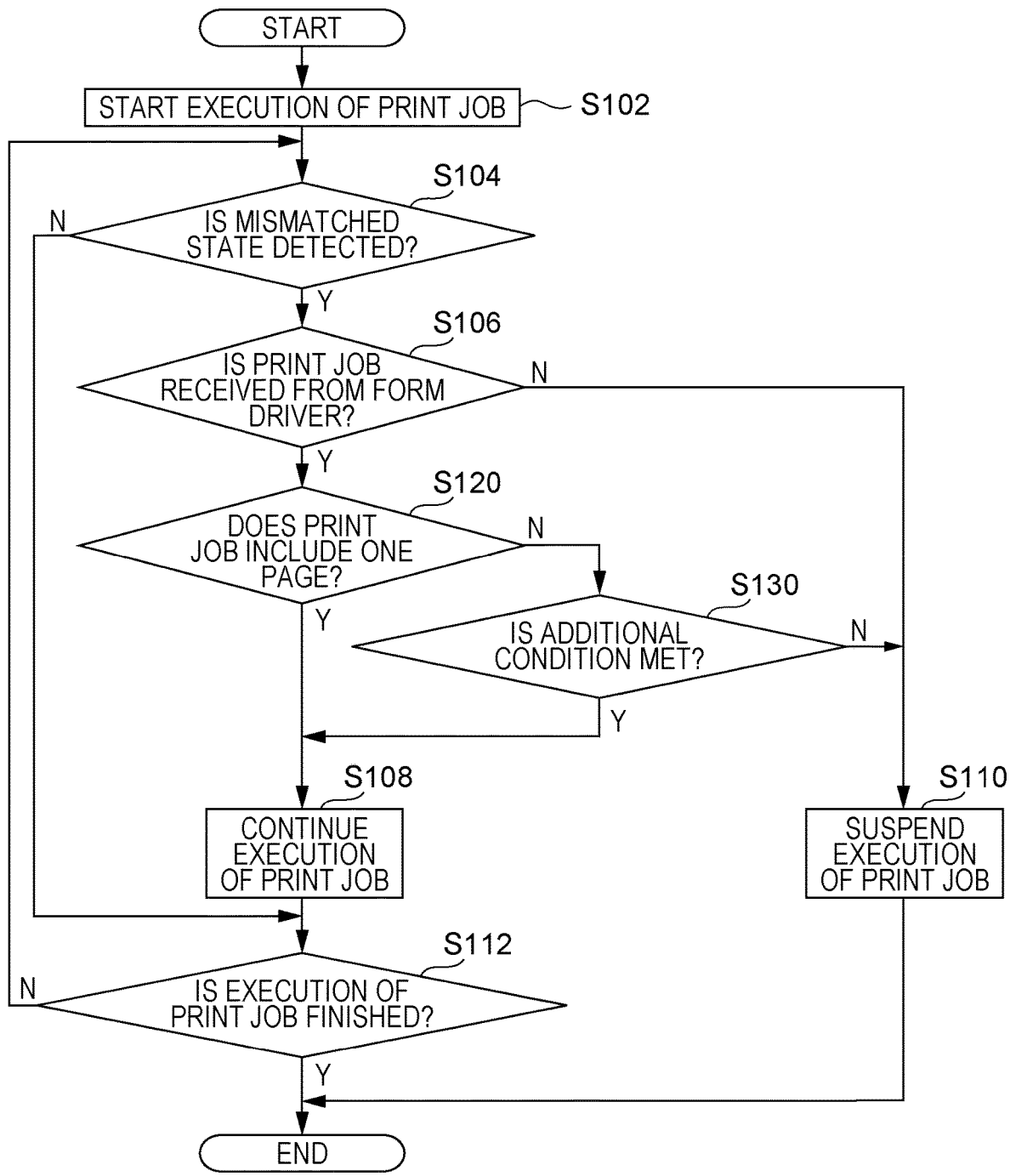
FIG. 8 is a flowchart illustrating the flow of a print process performed by a printer according to a third exemplary embodiment.

Next, a third exemplary embodiment will be described. FIG. 8 is a flowchart illustrating the flow of a print process according to the third exemplary embodiment. Portions of the present exemplary embodiment that are the same as the corresponding portions of the second exemplary embodiment are given the same reference numerals to omit description thereof as appropriate.

In the third exemplary embodiment, the controller 50C performs suspension control in the case where the print job includes a plurality of pages, an additional condition is not met, and there occurs a mismatched state during execution of a print job received from the form driver.

Meanwhile, the controller 50C performs continuation control in the case where the print job includes a plurality of pages, an additional condition is met, and there occurs a mismatched state during execution of a print job received from the form driver.

The additional condition may be that the form driver designates monochrome and character printing and does not designate any of rotation and sizing (hereinafter referred to as a "designation condition"), by way of example.

In the form printing, the print job often designates monochrome printing, rather than color printing, and often designates character printing. In the form printing, in addition, the print job often does not designate any of image rotation and sizing. Therefore, the designation condition is used as the additional condition for determining the form printing.

The additional condition may also be that the paper size of the paper P supplied from the storage sections 21, 22, and 23 and detected by the detection section 50B during execution of the print job coincides with a size stored in advance (hereinafter referred to as a "coincidence condition").

While printing media of various sizes are used as the printing medium in the form printing, printing media of a certain size are more often used. Therefore in the present exemplary embodiment, the certain size of printing media that are more often used is stored in the storage 54 in advance, and the coincidence condition is used as the additional condition.

The additional condition may further be that the print job designates any of the storage sections 21, 22, and 23 (hereinafter referred to as a "storage section designation condition") (see the modification of the first exemplary embodiment discussed earlier).

The additional condition may further be that the print job designates printing on one surface of the paper P (hereinafter referred to as a "single-sided printing condition").

Some additional conditions are prescribed by the content designated by the driver such as the designation condition, the storage section designation condition, and the single-sided printing condition discussed earlier, while other additional conditions are prescribed by the size of the paper actually detected such as the coincidence condition. The additional conditions may include a plurality of the designation condition, the coincidence condition, the storage section designation condition, and the single-sided printing condition. In this case, it is determined that the additional condition is met in the case where all of the plurality of conditions are met, and it is determined that the additional condition is not met in the case where at least one of the plurality of conditions is not met.

The function of the third exemplary embodiment will be described below.

As illustrated in FIG. 8, the CPU 51 proceeds to step S130 in the case where it is determined in step S120 that the print job includes two pages or more. In step S130, the CPU 51 determines whether or not the additional condition is met.

In the case where it is determined in step S130 that the additional condition is met, the CPU 51 performs continuation control for continuing execution of the print job (step S108), and proceeds to step S112.

In the case where it is determined in step S130 that the additional condition is not met, on the other hand, the CPU 51 performs suspension control for suspending execution of the print job (step S110), and ends the print process. Consequently, operation of the various sections of the printer 10 is stopped. Specifically, operation of the storage sections 21, 22, and 23 to supply the next paper P to the printing section 30, operation of the printing section 30 to print on the paper P, etc. are stopped.

In the present exemplary embodiment, as described above, the CPU 51 performs suspension control in the case where the print job includes a plurality of pages, an additional condition is not met, and there occurs a mismatched state during execution of a print job received from the form driver.

Meanwhile, the CPU 51 performs continuation control in the case where the print job includes a plurality of pages, an additional condition is met, and there occurs a mismatched state during execution of a print job received from the form driver.

In the present exemplary embodiment, in this manner, continuation control is performed on condition that the additional condition is met in the case where the print job includes a plurality of pages. In other words, in the present exemplary embodiment, the additional condition is added in the case where the print job includes a plurality of pages, in order to improve the precision in determining whether or not form printing is performed, considering that there is a lower possibility of form printing and there is a higher effect of erroneous printing than the case where the print job includes one page. As discussed earlier, some additional condition are prescribed by the content designated by the driver, while other additional conditions are prescribed by the size of the paper actually detected. The determination precision is considered to be higher when determining form printing from the actual size of the paper than determining form printing from the content designated by the driver. Hence, the latter additional conditions are considered to be stricter.

In a configuration (hereinafter referred to as a "third configuration") in which continuation control is performed also in the case where the print job includes a plurality of pages and the additional condition is not met, erroneous printing tends to be caused since the additional condition is not imposed. In the third configuration, in the case where erroneous printing is caused, erroneous printing is performed for a plurality of pages (e.g. 100 pages).

In the present exemplary embodiment, on the contrary, the occurrence of erroneous printing is suppressed compared to the third configuration since the additional condition is imposed.

In the form printing, as discussed earlier, the print job often designates monochrome printing, rather than color printing, and often designates character printing. In the form printing, in addition, the print job often does not designate any of image rotation and sizing.

In the case where a coincidence condition is used as the additional condition, it is determined that the paper size of the paper P supplied from the storage sections 21, 22, and 23 coincides with a size stored in advance.

Fourth Exemplary Embodiment

Figure 9:
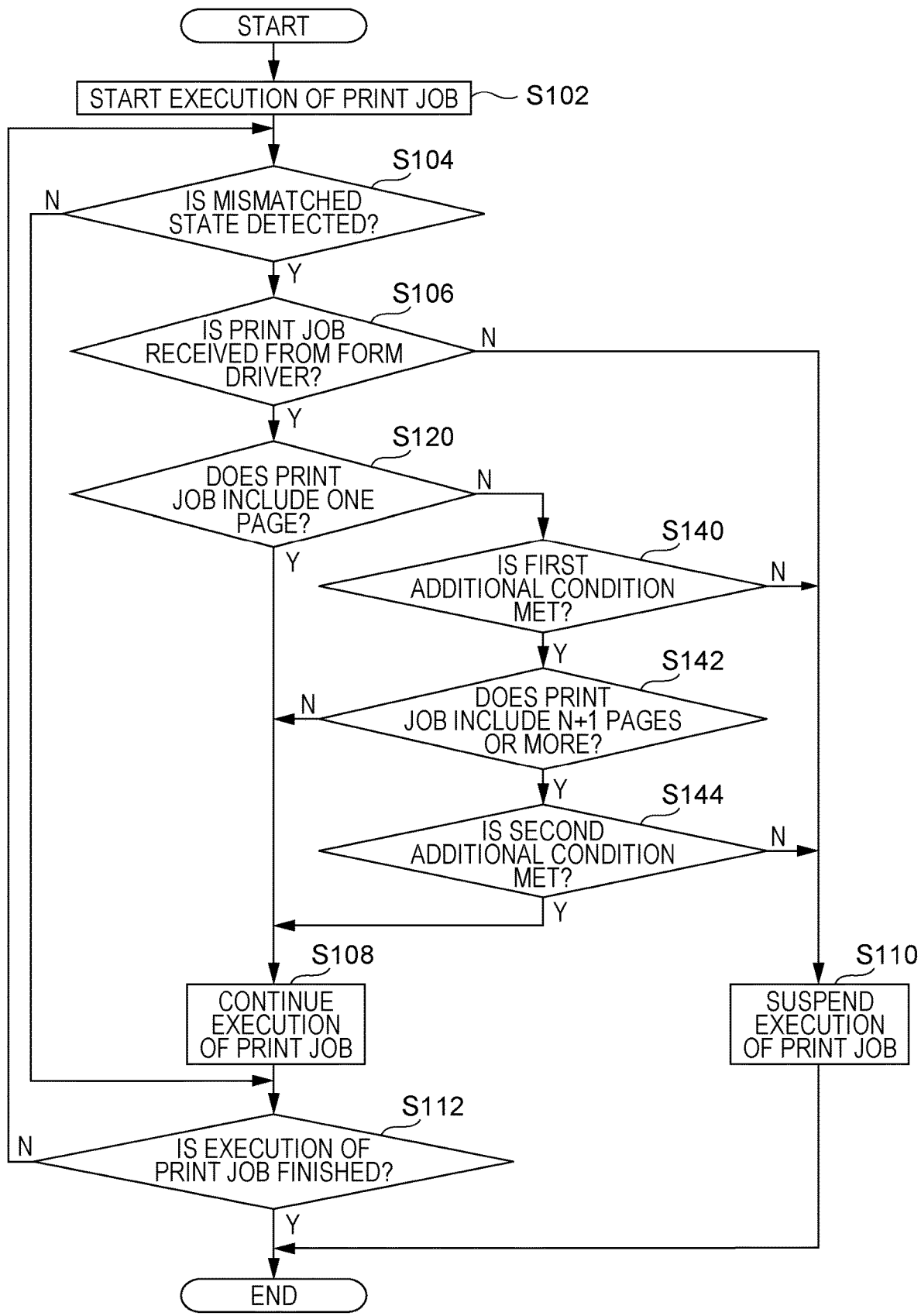
FIG. 9 is a flowchart illustrating the flow of a print process performed by a printer according to a fourth exemplary embodiment.

Next, a fourth exemplary embodiment will be described. FIG. 9 is a flowchart illustrating the flow of a print process according to the fourth exemplary embodiment. Portions of the present exemplary embodiment that are the same as the corresponding portions of the third exemplary embodiment are given the same reference numerals to omit description thereof as appropriate.

In the fourth exemplary embodiment, the controller 50C performs suspension control in the case where the print job includes two pages or more and N (N≥2) pages or less and in the case where a first additional condition is not met and there occurs a mismatched state during execution of a print job received from the form driver.

Meanwhile, the controller 50C performs continuation control in the case where the print job includes two pages or more and N (N≥2) pages or less and in the case where the first additional condition is met and there occurs a mismatched state during execution of a print job received from the form driver.

The first additional condition may be one or a plurality of the designation condition, the storage section designation condition, and the single-sided printing condition discussed earlier, by way of example. The first additional condition may be the coincidence condition discussed earlier, or may be a different condition.

In the present exemplary embodiment, the number of pages N may be ten, by way of example. The number of pages N is not limited to ten, and may be two or more and nine or less, or may be 11 or more.

Further, the controller 50C performs suspension control in the case where the print job includes N+1 pages or more and in the case where at least one of the first additional condition and a second additional condition is not met and there occurs a mismatched state during execution of a print job received from the form driver.

Meanwhile, the controller 50C performs continuation control in the case where the print job includes N+1 pages or more and in the case where the second additional condition is met in addition to the first additional condition and there occurs a mismatched state during execution of a print job received from the form driver.

The second additional condition may be the coincidence condition discussed earlier, by way of example. The second additional condition may be one or a plurality of the designation condition, the storage section designation condition, and the single-sided printing condition discussed earlier, or may be a different condition. It should be noted, however, that the coincidence condition provides a higher precision in determining form printing than any of the designation condition, the storage section designation condition, and the single-sided printing condition. (See the third exemplary embodiment.)

The setting of the first additional condition, the second additional condition, and the number of pages N may be changeable in accordance with an input made by the user via the user interface 55.

The function of the fourth exemplary embodiment will be described below.

As illustrated in FIG. 9, the CPU 51 proceeds to step S140 in the case where it is determined in step S120 that the print job includes two pages or more. In step S140, the CPU 51 determines whether or not the first additional condition is met.

In the case where it is determined in step S140 that the first additional condition is met, the CPU 51 proceeds to step S142.

In the case where it is determined in step S140 that the first additional condition is not met, on the other hand, the CPU 51 performs suspension control for suspending execution of the print job (step S110), and ends the print process. Consequently, operation of the various sections of the printer 10 is stopped. Specifically, operation of the storage sections 21, 22, and 23 to supply the next paper P to the printing section 30, operation of the printing section 30 to print on the paper P, etc. are stopped.

In step S142, the CPU 51 determines whether or not the print job includes N+1 pages (e.g. 11 pages) or more during execution of a print job received from the form driver.

In the case where it is determined in step S142 that the print job includes N pages (e.g. ten pages) or less, the CPU 51 performs continuation control for continuing execution of the print job (step S108), and proceeds to step S112.

In the case where it is determined in step S142 that the print job includes N+1 pages or more, on the other hand, the CPU 51 proceeds to step S144. In step S144, the CPU 51 determines whether or not the second additional condition is met.

In the case where it is determined in step S144 that the second additional condition is met, the CPU 51 performs continuation control for continuing execution of the print job (step S108), and proceeds to step S112.

In the case where it is determined in step S144 that the second additional condition is not met, on the other hand, the CPU 51 performs suspension control for suspending execution of the print job (step S110), and ends the print process.

In the present exemplary embodiment, as described above, continuation control is performed on condition that the first additional condition is met in the case where the print job includes two pages or more and N (N≥2) pages or less. Continuation control is performed on condition that both the first additional condition and the second additional condition are met in the case where the print job includes an increased number of pages, that is, N+1 pages or more.

In other words, in the present exemplary embodiment, an increased number of additional conditions are added as the print job includes an increased number of pages, in order to improve the precision in determining whether or not form printing is performed, considering a reduction in the possibility of form printing and the effect of erroneous printing.

In a configuration (hereinafter referred to as a "fourth configuration") in which continuation control is performed also in the case where the print job includes N+1 pages or more and only the first additional condition is met, erroneous printing tends to be caused since the second additional condition is not imposed. In the fourth configuration, in the case where erroneous printing is caused, erroneous printing is performed for N+1 pages or more.

In the present exemplary embodiment, on the contrary, the occurrence of erroneous printing is suppressed compared to the fourth configuration since the second additional condition is also imposed in addition to the first additional condition.

Fifth Exemplary Embodiment

Figure 10:
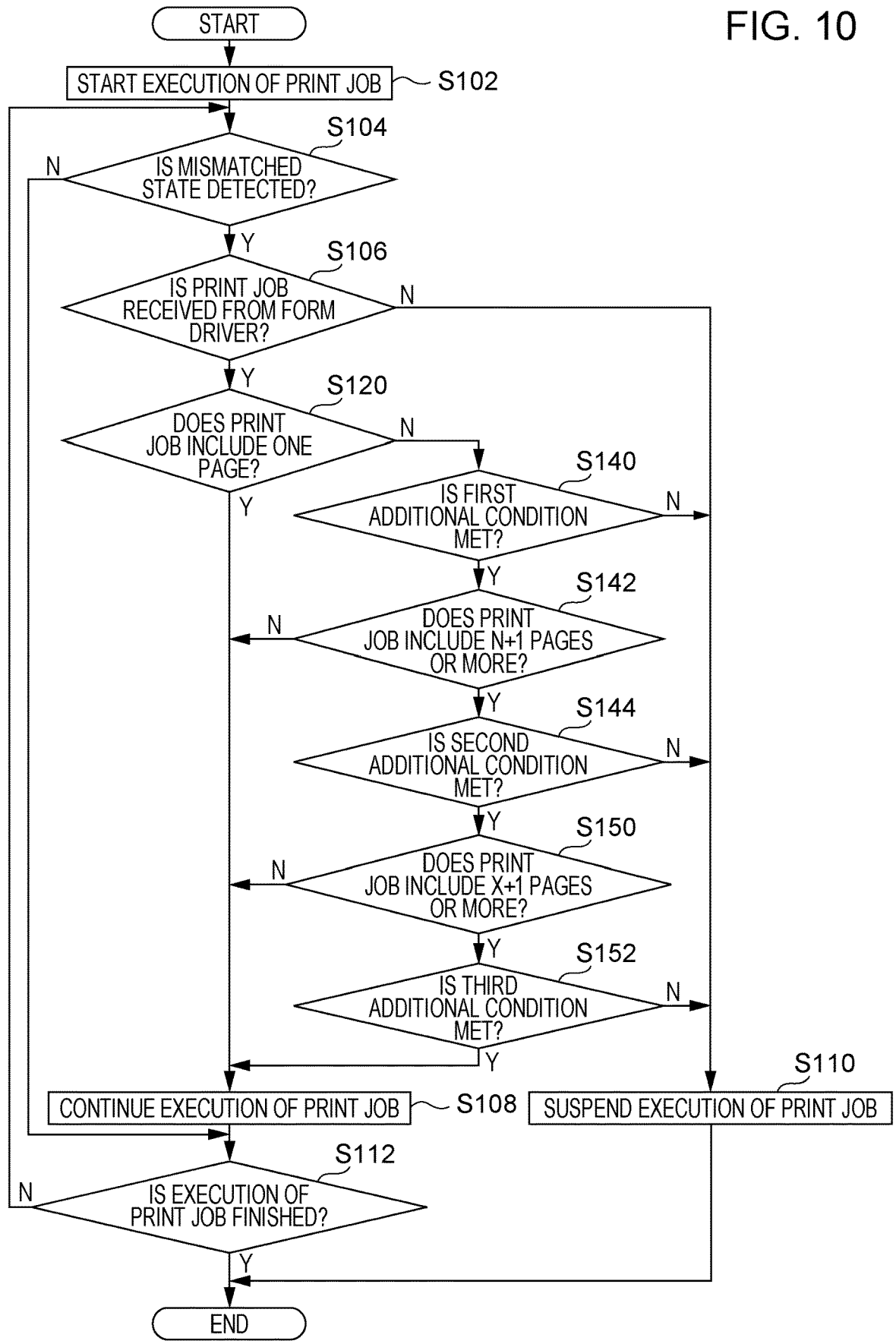
FIG. 10 is a flowchart illustrating the flow of a print process performed by a printer according to a fifth exemplary embodiment.

Next, a fifth exemplary embodiment will be described. FIG. 10 is a flowchart illustrating the flow of a print process according to the firth exemplary embodiment. Portions of the present exemplary embodiment that are the same as the corresponding portions of the fourth exemplary embodiment are given the same reference numerals to omit description thereof as appropriate.

While the first additional condition and the second additional condition are used in accordance with the number of pages included in a print job in the fourth exemplary embodiment, a third additional condition is further used in addition to the first additional condition and the second additional condition in the fifth exemplary embodiment.

Specifically, in the fifth exemplary embodiment, the controller 50C performs suspension control in the case where the print job includes two pages or more and N (N≥2) pages or less and in the case where a first additional condition is not met and there occurs a mismatched state during execution of a print job received from the form driver.

Meanwhile, the controller 50C performs continuation control in the case where the print job includes two pages or more and N (N≥2) pages or less and in the case where the first additional condition is met and there occurs a mismatched state during execution of a print job received from the form driver.

The first additional condition may be the designation condition discussed earlier, by way of example. The first additional condition may be one or a plurality of the storage section designation condition, the single-sided printing condition, and the coincidence condition discussed earlier, or may be a different condition.

In the present exemplary embodiment, the number of pages N may be ten, by way of example. The number of pages N is not limited to ten, and may be two or more and nine or less, or may be 11 or more.

Further, the controller 50C performs suspension control in the case where the print job includes N+1 pages or more and X pages (X≥N+1) or less and in the case where at least one of the first additional condition and a second additional condition is not met and there occurs a mismatched state during execution of a print job received from the form driver.

Meanwhile, the controller 50C performs continuation control in the case where the print job includes N+1 pages or more and X (X≥N+1) pages or less and in the case where the second additional condition is met in addition to the first additional condition and there occurs a mismatched state during execution of a print job received from the form driver.

The second additional condition may be both the storage section designation condition and the single-sided printing condition discussed earlier, by way of example. One or a plurality of such conditions may be used. The second additional condition may be one of the storage section designation condition and the single-sided printing condition discussed earlier. Alternatively, the second additional condition may be one or a plurality of the designation condition and the coincidence condition discussed earlier, or may be a different condition.

In the present exemplary embodiment, the number of pages X may be 30, by way of example. The number of pages X is not limited to 30, and may be three or more and 29 or less, or may be 31 or more, as long as X is N+1 or more.

Further, the controller 50C performs suspension control in the case where the print job includes X+1 pages or more and in the case where at least one of the first additional condition, the second additional condition, and the third additional condition is not met and there occurs a mismatched state during execution of a print job received from the form driver.

Meanwhile, the controller 50C performs continuation control in the case where the print job includes X+1 pages or more and in the case where the third additional condition is met in addition to the first additional condition and the second additional condition and there occurs a mismatched state during execution of a print job received from the form driver.

The third additional condition may be the coincidence condition discussed earlier, by way of example. In the case where the coincidence condition is met, there is a high possibility that the printing medium supplied from the storage sections 21, 22, and 23 is a printing medium for forms, and it is determined that the print job has been given with the user being aware of the difference between the size of a printing medium designated by the print job and the size of a supplied printing medium, even if there is any such difference, and execution of the print job is continued.

The third additional condition may be one or a plurality of the designation condition, the storage section designation condition, and the single-sided printing condition discussed earlier, or may be a different condition. The third additional condition may also be grasped as an example of a "second additional condition".

The setting of the first additional condition, the second additional condition, the third additional condition, the number of pages N, and the number of pages X may be changeable in accordance with an input made by the user via the user interface 55.

The function of the fifth exemplary embodiment will be described below.

As illustrated in FIG. 10, the CPU 51 proceeds to step S150 in the case where it is determined in step S144 that the second additional condition is met.

In the case where it is determined in step S144 that the second additional condition is not met, on the other hand, the CPU 51 performs suspension control for suspending execution of the print job (step S110), and ends the print process.

In step S150, the CPU 51 determines whether or not the print job includes X+1 pages (e.g. 31 pages) or more during execution of a print job received from the form driver.

In the case where it is determined in step S150 that the print job includes X pages (e.g. 30 pages) or less, the CPU 51 performs continuation control for continuing execution of the print job (step S108), and proceeds to step S112.

In the case where it is determined in step S150 that the print job includes X+1 pages or more, on the other hand, the CPU 51 proceeds to step S152. In step S152, the CPU 51 determines whether or not the third additional condition is met.

In the case where it is determined in step S152 that the third additional condition is met, the CPU 51 performs continuation control for continuing execution of the print job (step S108), and proceeds to step S112.

In the case where it is determined in step S152 that the third additional condition is not met, on the other hand, the CPU 51 performs suspension control for suspending execution of the print job (step S110), and ends the print process.

In the present exemplary embodiment, as described above, continuation control is performed on condition that the first additional condition is met in the case where the print job includes two pages or more and N (N≥2) pages or less. Continuation control is performed on condition that both the first additional condition and the second additional condition are met in the case where the print job includes an increased number of pages, that is, N+1 pages or more and X pages (X≥N+1) or less.

Continuation control is performed on condition that three conditions, namely the first additional condition, the second additional condition, and the third additional condition, are met in the case where the print job includes a further increased number of pages, that is, X pages or more.

In other words, in the present exemplary embodiment, an increased number of additional conditions are added as the print job includes an increased number of pages, in order to improve the precision in determining whether or not form printing is performed, considering a reduction in the possibility of form printing and the effect of erroneous printing.

In a configuration (hereinafter referred to as a "fifth configuration") in which continuation control is performed also in the case where the print job includes X+1 pages or more and only the first additional condition and the second additional condition are met, erroneous printing tends to be caused since the third additional condition is not imposed. In the fifth configuration, in the case where erroneous printing is caused, erroneous printing is performed for X+1 pages or more.

In the present exemplary embodiment, on the contrary, the occurrence of erroneous printing is suppressed compared to the fifth configuration since the third additional condition is also imposed in addition to the first additional condition and the second additional condition.

Other Modifications

In the first to fifth exemplary embodiments discussed earlier, the form driver supports a smaller number of initially set sizes of printing media that are selectable by the user than that of the regular size driver (hereinafter referred to as a first condition), and enables the user to additionally set a larger number of sizes of printing media than that of the regular size driver (hereinafter referred to as a second condition). However, the present disclosure is not limited thereto. It is only necessary that the form driver should meet one of the first condition and the second condition.

The present disclosure is not limited to the exemplary embodiments described above, and a variety of modifications, changes, and improvements may be made without departing from the scope and spirit of the present disclosure.

In the embodiments above, the term "processor" refers to hardware in a broad sense. Examples of the processor includes general processors (e.g., the CPU discussed earlier) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A printer comprising
a processor configured to:
receive a print job from a first driver and a second driver that supports a smaller number of initially set sizes of printing media that are selectable by a user than a number of initially set sizes of printing media that is supported by the first driver,
determine which driver the print job is received from,
perform suspension control for suspending execution of the print job in a case where there occurs a disagreement state in which a size of a printing medium designated by the print job and a size of a printing medium supplied from a supply section during execution of the print job are different from each other during execution of a print job received from the first driver, and
perform continuation control for continuing execution of the print job in a case where there occurs the disagreement state during execution of a print job received from the second driver,
wherein the processor is further configured to
perform the suspension control in a case where the print job includes a predetermined number of pages or more and there occurs the disagreement state during execution of a print job received from the second driver, and
perform the continuation control in a case where the print job includes less than the predetermined number of pages and there occurs the disagreement state during execution of a print job received from the second driver.

2. The printer according to claim 1,
wherein the predetermined number of pages is two.

3. The printer according to claim 1,
wherein the processor is further configured to
perform the suspension control in a case where the print job includes a plurality of pages, an additional condition is not met, and there occurs the disagreement state during execution of a print job received from the second driver, and
perform the continuation control in a case where the print job includes a plurality of pages, the additional condition is met, and there occurs the disagreement state during execution of a print job received from the second driver.

4. The printer according to claim 3,
wherein the additional condition is that the driver designates monochrome and character printing and does not designate any of rotation and sizing.

5. The printer according to claim 3,
wherein the additional condition is that the size of the printing medium supplied from the supply section during execution of the print job coincides with a size stored in advance.

6. The printer according to claim 3,
wherein the processor is further configured to
perform the suspension control in a case where the print job includes two pages or more and N pages (N≥2) or less and in a case where a first additional condition is not met and there occurs the disagreement state during execution of a print job received from the second driver,
perform the continuation control in a case where the print job includes two pages or more and N pages (N≥2) or less and in a case where the first additional condition is met and there occurs the disagreement state during execution of a print job received from the second driver,
perform the suspension control in a case where the print job includes N+1 pages or more and in a case where at least one of the first additional condition and a second additional condition is not met and there occurs the disagreement state during execution of a print job received from the second driver, and perform the continuation control in a case where the print job includes N+1 pages or more and in a case where the second additional condition is met in addition to the first additional condition and there occurs the disagreement state during execution of a print job received from the second driver.

7. The printer according to claim 6,
wherein the second additional condition is that the size of the printing medium supplied from the supply section during execution of the print job coincides with a size stored in advance.

8. The printer according to claim 1,
wherein the processor is further configured to perform the continuation control in a case where the print job designates the supply section and there occurs the disagreement state during execution of a print job received from the second driver.

9. A printer comprising
a processor configured to:
   receive a print job from a first driver and a second driver that enables a user to additionally set a larger number of sizes of printing media than a number of sizes printing media that is supported by the first driver,
   determine which driver the print job is received from,
   perform suspension control for suspending execution of the print job in a case where there occurs a disagreement state in which a size of a printing medium designated by the print job and a size of a printing medium supplied from a supply section during execution of the print job are different from each other during execution of a print job received from the first driver, and
   perform continuation control for continuing execution of the print job in a case where there occurs the disagreement state during execution of a print job received from the second driver,
wherein the processor is further configured to
   perform the suspension control in a case where the print job includes a predetermined number of pages or more and there occurs the disagreement state during execution of a print job received from the second driver, and
   perform the continuation control in a case where the print job includes less than the predetermined number of pages and there occurs the disagreement state during execution of a print job received from the second driver.

10. A non-transitory computer readable medium storing a print program causing a computer to execute a process comprising:
   receiving a print job from a first driver and a second driver that supports a smaller number of initially set sizes of printing media that are selectable by a user than a number of initially set sizes of printing media that is supported by the first driver,
   determining which driver the print job is received from,
   performing suspension control for suspending execution of the print job in a case where there occurs a disagreement state in which a size of a printing medium designated by the print job and a size of a printing medium supplied from a supply section during execution of the print job are different from each other during execution of a print job received from the first driver, and
   performing continuation control for continuing execution of the print job in a case where there occurs the disagreement state during execution of a print job received from the second driver,
wherein the process further comprises
   performing the suspension control in a case where the print job includes a predetermined number of pages or more and there occurs the disagreement state during execution of a print job received from the second driver, and
   performing the continuation control in a case where the print job includes less than the predetermined number of pages and there occurs the disagreement state during execution of a print job received from the second driver.

* * * * *